US011133923B2

(12) United States Patent
Chasko et al.

(10) Patent No.: US 11,133,923 B2
(45) Date of Patent: Sep. 28, 2021

(54) CRYPTOGRAPHIC OPERATIONS USING INTERNET OF THINGS DEVICE POOL

(71) Applicant: Landis+Gyr Innovations, Inc., Alpharetta, GA (US)

(72) Inventors: Stephen Chasko, Marietta, GA (US); Michael Demeter, Alpharetta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 401 days.

(21) Appl. No.: 16/169,478

(22) Filed: Oct. 24, 2018

(65) Prior Publication Data

US 2020/0136808 A1    Apr. 30, 2020

(51) Int. Cl.
*H04L 9/06* (2006.01)
*H04L 9/32* (2006.01)
*H04L 29/06* (2006.01)
*H04L 29/08* (2006.01)

(52) U.S. Cl.
CPC .......... *H04L 9/0643* (2013.01); *H04L 9/0637* (2013.01); *H04L 9/3218* (2013.01); *H04L 63/12* (2013.01); *H04L 67/10* (2013.01); *H04L 67/12* (2013.01); *H04L 2209/38* (2013.01)

(58) Field of Classification Search
CPC ... H04L 9/0643; H04L 9/0637; H04L 9/3218; H04L 63/12; H04L 67/10; H04L 67/12; H04L 2209/38; H04L 2209/56; H04L 9/3239; Y04S 40/18; Y04S 40/20
See application file for complete search history.

(56) References Cited

U.S. PATENT DOCUMENTS

| 8,767,744 B2 * | 7/2014 | Osterloh | ................. H04Q 9/00 370/395.4 |
|---|---|---|---|
| 2018/0109541 A1 | 4/2018 | Gleichauf | |
| 2018/0115425 A1 | 4/2018 | Dechu et al. | |
| 2019/0139159 A1 * | 5/2019 | Sarker | .................... G06Q 30/08 |

OTHER PUBLICATIONS

Anonymous, "Hash—Work Distribution in a Mining Pool", Bitcoin Stack Exchange, available online at, https://bitcoin.stackexchange.com/questions/37279/work-distribution-in-a-mining-pool, Mar. 31, 2016, 3 pages.
International Patent Application No. PCT/US2019/057327, International Search Report and Written Opinion, dated Jan. 30, 2020, 12 pages.

* cited by examiner

*Primary Examiner* — Mohammed Waliullah
(74) *Attorney, Agent, or Firm* — Kilpatrick Townsend & Stockton LLP

(57) ABSTRACT

A method for performing a blockchain operation includes receiving an indication of a number of a plurality of endpoints in a processing network. The method further includes assigning nonce offsets to each endpoint of the plurality of endpoints and assigning communication randomization windows to each endpoint of the plurality of endpoints. The communication randomization windows stagger communication windows of the endpoints to a head-end. Additionally, the method includes sending a message to each of the endpoints indicating an operation to perform and an expected result. Further, the method includes receiving a success indication from a first endpoint of the plurality of endpoints. The success indication including a nonce match value from the nonce offset of the first endpoint. Furthermore, the method includes verifying a nonce match value with the expected result.

20 Claims, 5 Drawing Sheets

CRYPTOGRAPHIC OPERATIONS USING INTERNET OF THINGS DEVICE POOL

TECHNICAL FIELD

This disclosure relates generally to processes for performing cryptographic operations. More particularly this disclosure relates to the use of a pool of internet of things (IoT) devices to provide processing bandwidth for the cryptographic operations.

BACKGROUND

Internet of Things (IoT) devices, such as smart power, gas, and water meters and other smart electronics, are used as mechanisms to interconnect devices to form an IoT data network. Each device in the IoT data network includes one or more processors used to take meter readings, communicate with other devices, or perform other functions related to the IoT device. The processors of the devices in the IoT data network often perform processing operations for only a portion of time. During a remainder of the time, the processors sit idle waiting for another scheduled processing operation and/or an unscheduled communication from another IoT device. For example, a processor in a smart power meter may operate only when taking meter readings, when transmitting the meter readings across a mesh network or another IoT data network, and when receiving information from the mesh network or another IoT data network.

The processors of the devices in the IoT data network may fail to utilize a significant amount of processing bandwidth that is available between metering and communication functions. Thus, the devices may sit idle for significant periods of time when the devices lack tasks to complete associated with primary functions of the devices. Due to these idle time periods of devices across the IoT data network, significant processing opportunities are lost in the devices.

SUMMARY

Aspects and examples are disclosed for apparatuses and processes for performing blockchain operations using an Internet of Things (IoT) device pool. For instance, a method for performing a blockchain operation includes receiving an indication of a number of a plurality of endpoints in a processing network and assigning nonce offsets to each endpoint of the plurality of endpoints. The method also includes assigning communication randomization windows to each endpoint of the plurality of endpoints. The communication randomization windows stagger communication windows of the endpoints to a head-end. Further, the method includes sending a message to each of the endpoints indicating an operation to perform and an expected result. Furthermore, the method includes receiving a success indication from a first endpoint of the plurality of endpoints. The success indication includes a nonce match value from the nonce offset of the first endpoint. Moreover, the method includes verifying a nonce match value with the expected result.

In another example, a system includes a head-end and a plurality of nodes communicatively coupled to the head-end. Each of the plurality of nodes includes a processor configured that executes computer-readable instructions and a memory that stores the computer-readable instructions. The computer-readable instructions, when executed by the processor, cause the processor to receive a nonce offset that includes a range of nonce values smaller than a total number of nonce values available in a blockchain operation. The instructions also cause the processor to receive a communication randomization window from a plurality of communication randomization windows that stagger communication of the plurality of nodes to the head-end. Further, the instructions cause the processor to receive an indication of an operation to perform and an expected result. Furthermore, the instructions cause the processor to perform hashing operations based on the operation to perform and the nonce offset and to transmit a success indication to the head-end upon achieving the expected result. The success indication includes a nonce match value from the nonce offset.

In an additional example, a method includes receiving a nonce offset. The nonce offset includes a range of nonce values smaller than a total number of nonces available in a blockchain operation. The method also includes receiving a communication randomization window and receiving an indication of an operation to perform and an expected result. Additionally, the method includes performing hashing operations based on the operation to perform and the nonce offset. Further, the method includes transmitting a success indication to a head-end of a processing network upon achieving the expected result. The success indication includes a nonce match value from the nonce offset.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are provided for cryptocurrency mining using a pool of Internet of Things (IoT) devices. The IoT devices connected within an IoT network may include devices all performing a primary function (e.g., metering devices) while performing cryptocurrency mining operations as a secondary function. In another example, the IoT network may connect several different types of IoT devices (e.g., meters, routers, gateways, etc.). As an example, endpoints or any other nodes (e.g., IoT devices) of an IoT system may not maximize processing bandwidth of the processors available in the endpoints or other nodes while performing a primary function. The processors in the IoT devices may sit idle until a scheduled task is performed, or until an operation is requested of the IoT devices (e.g., by another IoT device). To remedy the loss of unused processing bandwidth, an IoT data network may coordinate processing operations executed by the processors of the IoT devices. In this manner, the excess processing bandwidth is used to accomplish productive secondary tasks in excess of the typical operations performed by the IoT devices.

Because the IoT system may include a large number of IoT devices, and each of the IoT devices may have untapped processing bandwidth, a pool of IoT devices of the IoT system may be capable of performing processing functions unrelated to the typical operations of the IoT devices. For example, the pool of IoT devices may perform cryptocurrency mining operations during time periods that the processors of the IoT devices are idle during traditional operation of the IoT devices. Similarly, the pool of IoT devices may perform other processing functions not specifically related to cryptocurrency mining. For example, the pool of IoT devices may be capable of pooling processing power and performing any number of processing intensive tasks.

Figure 1:
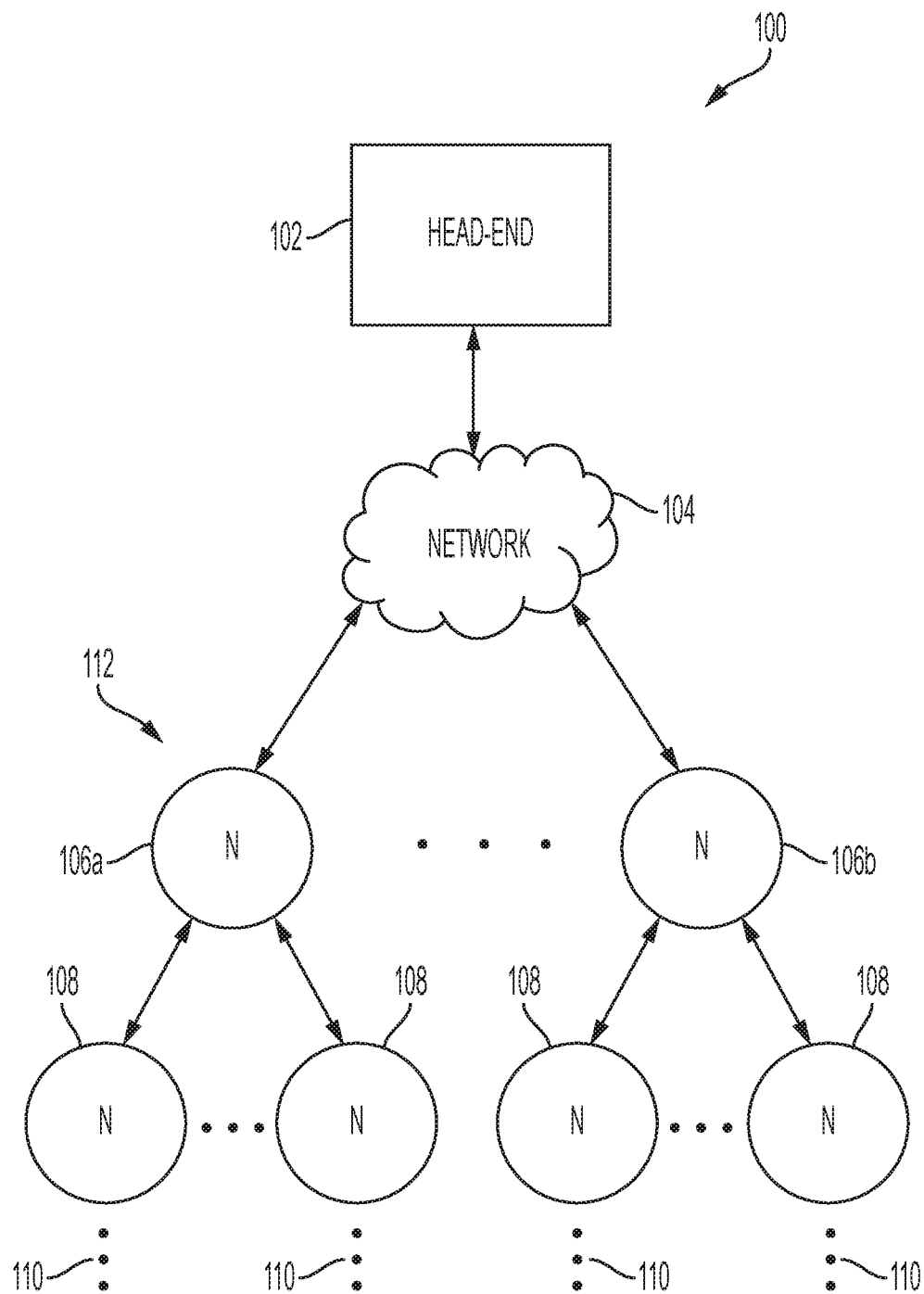
FIG. 1 is a block diagram illustrating an example of an Internet of Things (IoT) system, in accordance with one or more examples.

FIG. 1 is a block diagram illustrating an example of an Internet of Things (IoT) system 100. The IoT system 100 provides a network infrastructure for smart devices (e.g., resource consumption meters, vehicles, home appliances, etc. that include communication technology) to communicate across a network of nodes (i.e., the smart devices), the internet, an intranet, or a combination thereof. In an example where the IoT system 100 creates a mesh network of smart meters, the IoT system 100 includes a head-end 102, which may function as a central processing device that receives a stream of data from a network 104. The network 104 may be a mesh network, the internet, an intranet, or any other data communication network. Nodes 106 and 108 collect data associated with operation of the nodes 106 and 108 and transmit the data to the network 104 and ultimately to the head-end 102.

The nodes 106 and 108 may include root nodes 106a and 106b and child nodes 108. For example, the root nodes 106a and 106b are illustrated as communicating directly with the network 104, and the child nodes 108 are illustrated as communicating with the root nodes 106a and 106b. The root nodes 106a and 106b may be personal area network (PAN) coordinators, internet gateways, cellular connected devices, power line carrier (PLC) devices, or any other devices capable of connecting to the network 104. The root nodes 106a and 106b may generally be referred to as parent nodes due to data links with the child nodes 108 that are located at a node layer (e.g., layer one) below the root nodes 106a and 106b.

The child nodes 108 linked with other child nodes represented by ellipses 110 may also be referred to as parent nodes because the child nodes 108 are located at layer one of a network topology, while the child nodes represented by the ellipses 110 are located at layer two or lower of the network topology. For example, data from the child nodes represented by the ellipses 110 may travel through the child nodes 108 and the root nodes 106 before the data reaches the network 104 and the head-end 102, while data from the child nodes 108 travels only through the root nodes 106 before reaching the network 104 and the head-end 102. While only a root layer (i.e., the root nodes 106) and layer one (i.e., the child nodes 108) are illustrated in FIG. 1, more or fewer layers may also be included in the IoT system 100. Further, while FIG. 1 depicts a specific network topology (e.g., a DODAG tree), other network topologies are also possible (e.g., a ring topology, a mesh topology, a star topology, etc.).

The nodes 106 and 108 transmit operational data and communication data upstream toward the head-end 102 and downstream toward endpoint nodes of a mesh network 112. The mesh network 112 may generally refer to a network of data communication generated by communication links between the nodes 106 and 108. The nodes 106 and 108 may each include a processor that is able to perform tasks related to the individual nodes 106 and 108. For example, a node 106 or 108 representing a smart metering device may include a processor that is capable of reading metering information (e.g., power consumption) and communicating the metering information up the mesh network 112 to the network 104 and the head-end 102. Such tasks may only occupy a portion of the available processing bandwidth of the processor in the nodes 106 and 108.

While the bandwidth of an individual node 106 or 108 may provide only a small amount of bandwidth used during a computationally difficult operation, such as during cryptocurrency mining, the pool of nodes 106 and 108 in the IoT system 100 provides significant aggregate processing power. For example, during typical operations, each of the nodes 106 and 108 in the IoT system 100 has excess cycles available for additional operations. During the excess cycles, the nodes 106 and 108 may simultaneously perform cryptographic operations across the entire IoT system 100. In an example where the IoT system 100 includes one million smart meters as the nodes 106 and 108 (e.g., in an electric power grid of a large city or region), the IoT system 100 may be capable of executing approximately 3.6 trillion hashes (Th) per hour using a secure hash algorithm 256 (SHA-256). Continuing with this example, if approximately 2700 Th produce a bitcoin, the IoT system 100 with 1 million nodes 106 and 108 performing mining operations (i.e., performing hashes) may mine, on average, approximately 1 bitcoin per month. Further, as discussed below with respect to FIGS. 4 and 5, further optimization of the mining hardware and strategy of the nodes 106 and 108 may result in an increase in the mining rate of the IoT system 100.

Figure 2:
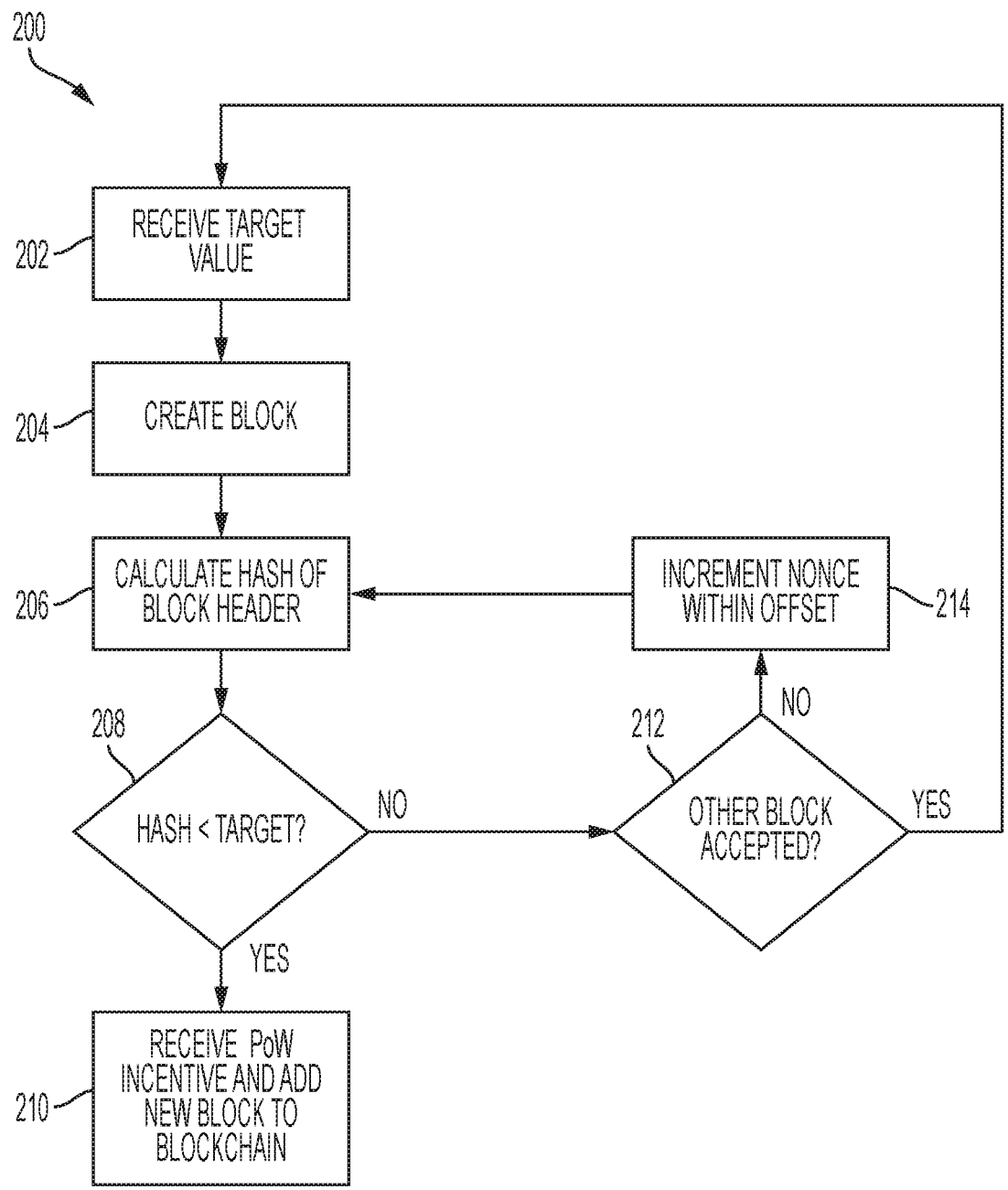
FIG. 2 is an example of a process for cryptocurrency mining, in accordance with one or more examples.

FIG. 2 is an example of a process 200 for cryptocurrency mining. The process 200 may use excess processing bandwidth of the IoT system 100 to perform the cryptocurrency mining operation. For example, at block 202, the process 200 involves receiving a target value at nodes 106 or 108 from the head-end 102. The target value is a 256-bit number that is public to all cryptocurrency miners. When a value, which is described in detail below as a block header, is hashed using the SHA-256 hashing algorithm, the resulting hash is compared to the target value to determine if the resulting hash solves the target problem. The target problem is to find a block header that results in a hash that has a hash value lower than the target value. While cryptocurrency mining operations are described below using the SHA-256 hashing algorithm, other hashing algorithms may also be used depending on the specific platform of the cryptocurrency mining operation.

The target value may change after each new block is added to a blockchain, and the difficulty of the target problem may be adjusted each time 2016 new blocks are added to the blockchain, as in a bitcoin mining environment. Additionally, the difficulty may change at other intervals depending on the specific mining environment or platform (e.g., bitcoin, Litecoin, Ethereum, etc.). As used herein, the term "blockchain" is used to refer to a list of records (i.e., blocks), where each block includes a cryptographic hash of the previous block in the blockchain. Each block of the blockchain is generated when a mining operation solves the target problem for the current target value, as discussed in greater detail below. The difficulty of the target value may be represented by how many zeros lead the 256-bit number of the target value. For example, if more zeros lead the 256-bit number, the difficulty increases, while fewer zeros leading the 256-bit number results in a decrease in difficulty. That is, it is easier to find a block header that hashes to a value less than the target value when the target value is larger (i.e., fewer leading zeros). The difficulty may increase or decrease based on how quickly a new block is added. For example, the difficulty may increase or decrease to maintain an average mining time of 10 minutes per block. As mining operations increase, the difficulty may also increase to maintain the average mining time.

At block 204, the process 200 involves creating a block. The block may be created at the head-end 102, which then provides the block to the nodes 106 and 108, the block may be created at each of the individual nodes 106 or 108, or the block may be created using a combination of the head-end 102 and the nodes 106 and 108. For example, a block is created, although not added to the blockchain, by processing valid cryptocurrency transactions.

The nodes 106 and 108, the head-end 102, or a combination thereof may validate transactions from a cryptocurrency transaction pool such that at least 1 MB of transactions are validated and listed in the block. In an example, the cryptocurrency transaction pool includes cryptocurrency transactions between cryptocurrency holders (e.g., one cryptocurrency holder buying a good or service from another cryptocurrency holder in exchange for cryptocurrency). These transactions are validated by ensuring that the purchaser actually owns the cryptocurrency that they are trying to send, and by ensuring that the purchaser has not already spent the cryptocurrency. Once a transaction is validated, the transaction data is added to the block created at block 204. This transaction validation process continues until the block includes at least 1 MB of validated transaction data.

Because each cryptocurrency miner is likely to validate a different set cryptocurrency transactions, each block generated during a mining process is likely to be different. This means that each cryptocurrency miner will be searching for a different nonce value to generate a block header hash that is less than the target value. Validating 1 MB of transactions may function as a key that enables a miner to begin guessing at values that will result in a hash less than the target value.

In addition to the list of transactions validated, the block created at block 204 may include a magic number (i.e., a number that identifies a blockchain network), a block size (i.e., a number that indicates a size of the block), a version (i.e., a cryptocurrency protocol), a previous block hash (i.e., a hash of a block header of the previous block of the blockchain), a merkle root (i.e., a digital fingerprint of all transactions included in the block), a timestamp (i.e., a time at which the block is established), a difficulty target (i.e., a numeric representation of the current difficulty), a nonce value (i.e., a variable value that is adjustable to find a hash that is less than the target value), a transaction counter (i.e., a numerical value indicating a count of transactions included in the block), and a transaction list (i.e., a list of each transaction in the block).

A block header of the block may be a portion of the block that is hashed to generate a hash value that is compared to the target value. The block header may include a numerical representation of the previous block hash, the merkle root, the timestamp, the difficulty target, and the nonce value. As discussed above, the nonce value is a variable portion of the block that can be changed by the miner to generate a block header value. The block header value, which is variable based on the nonce value, is hashed using a hashing algorithm to a hash value. A successful result of a hashing operation on the block header value is a hash value that is less than the target value. The nonce value may include a 32-bit number. Accordingly, the nonce value may have a range from 0 through 4,294,967,295 (i.e., $2^{32}-1$), and each different nonce value results in a different block header and a different hash value of the block header to compare to the target value.

At block 206, the process 200 involve calculating a hash of the block header at the nodes 106 and 108. In an example, calculating the hash of the block header involves performing the SHA-256 hashing algorithm on the block header. In another example, other hashing algorithms are also contemplated. The result of the SHA-256 hashing algorithm on the block header is a 256-bit hash value.

At block 208, the process 200 involves comparing the hash value calculated at block 206 to the target value received at block 202. If the hash value is less than the target value, at block 210, the process 200 involves receiving a proof of work incentive and adding a new block to the blockchain. In an example of bitcoin mining, the proof of work incentive may be 12.5 bitcoins. However, the value of the proof of work incentive halves every 210,000 blocks that are added to the blockchain. Other cryptocurrencies may also be provided as proof of work incentives depending on which type of cryptocurrency is mined during the process 200. Further, the new block added to the blockchain is the block created at block 204 including the specific nonce value that was used in the block header. The new block may be added to the block chain when the solution (i.e., the hash value that is less than the target value) is accepted by a majority of miners.

If, at block 208, the hash value is greater than the target value, at block 212 the process 200 involves determining whether a block from a different miner has been accepted. For example, if another block from a different miner has been accepted, the block created at block 204 is no longer valid in creating a new entry to the blockchain. Accordingly, if another block is accepted the process 200 may restart at block 202 by receiving a new target value.

If a block from another miner has not been accepted, at block 214, the process 200 involves incrementing or otherwise adjusting the nonce value within an offset. That is, the nonce value may be increased by 1 each time a hash is calculated that is not smaller than the target value. Additionally, a subsequent nonce value may be adjusted randomly (e.g., instead of incrementally) each time a hash is calculated that is not smaller than the target value. In an example, different nodes 106 and 108 may be assigned different offset values. In an example where each of the nodes 106 and 108 is not capable of hashing every possible nonce value in a time frame of the block (i.e., the average time for a new block to be mined), the range of nonce values may be split among the nodes 106 and 108. For example, when the IoT system 100 includes one million nodes, each node may be assigned approximately 4295 (e.g., $(2^{32}-1)/1,000,000$) nonce values to cover the entire range of nonce values. In other examples, the nodes 106 and 108 may include redundancy to decrease the likelihood of a successful nonce value being lost in the lossy mesh network 112 of the IoT system 100. In such an example where two nodes 106 and 108 cover the same nonce range, each of the one million nodes may be assigned approximately 8590 (e.g., $(2^{32}-1)/500,000$) nonce values to cover the entire range of nonce values twice.

When the nonce value of the node 106 or 108 increases by one within the offset of the node 106 or 108, the process 200 involves calculating the hash value of the new block header at block 206. The comparison of the new hash value with the target value is again performed at block 208, and the cycle repeats until the calculated hash value is less than the target value, another block is accepted, or all of the nonce values for the block have been exhausted without a successful hash value.

If all of the nonce values for the block have been exhausted, the nodes 106 and 108 may repeat the process 200 after creating a new block. For example, the new block may include a different time stamp, a different transaction list, or both that will change the hash values calculated at block 206. After the new block is created, incrementing the nonce values may begin again to find a hash of the new block header that is less than the target value.

Figure 3:
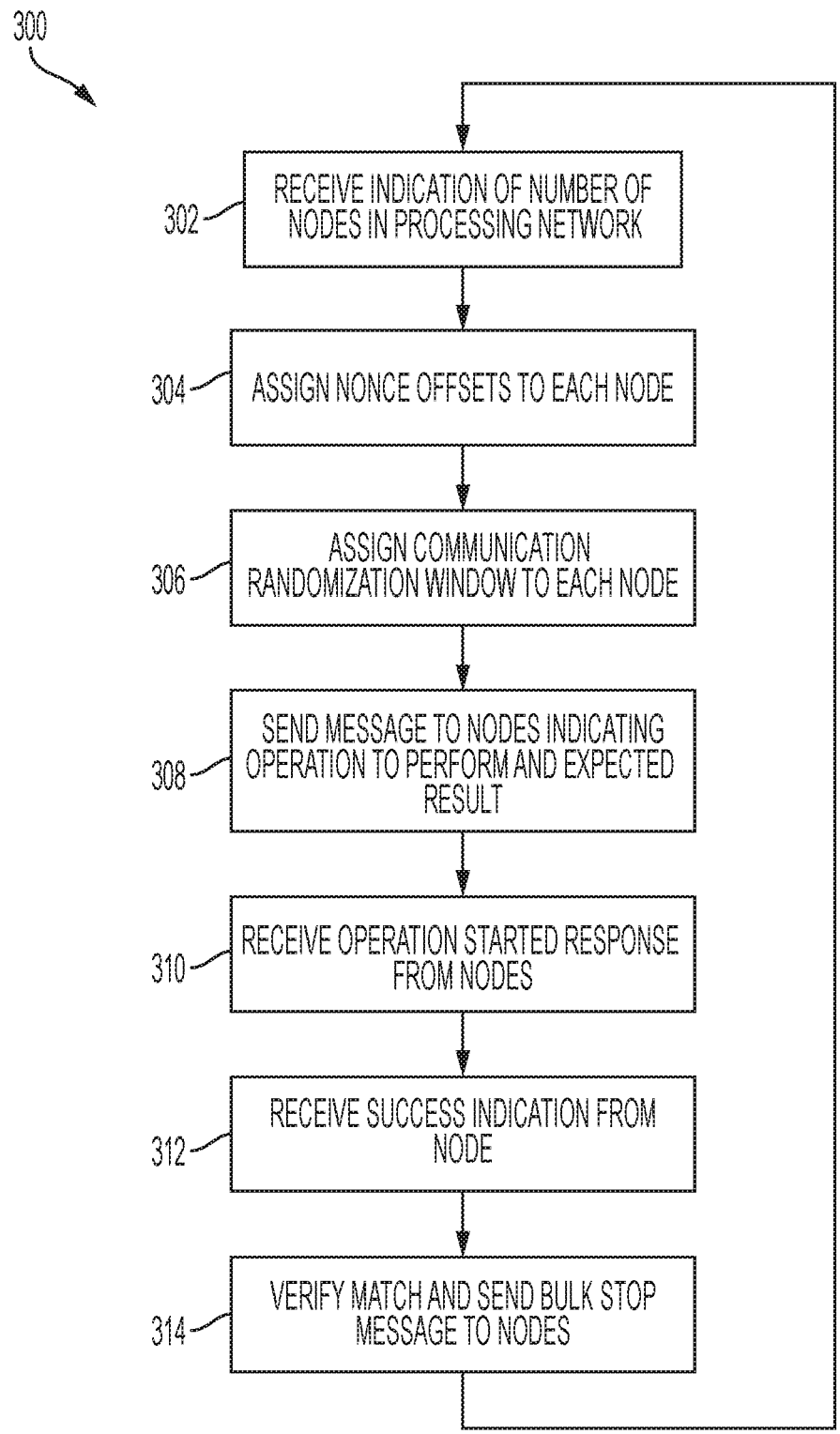
FIG. 3 is an example of a process for cryptocurrency mining using the IoT system, in accordance with one or more examples.

FIG. 3 is an example of a process 300 for cryptocurrency mining using the IoT system 100. At block 302, the process 300 involves receiving an indication of a number of nodes 106 and 108 in a processing network (e.g., a pool of IoT devices). The indication of the number of nodes 106 and 108 may be received by the head-end 102 of the IoT network 100, and the indication of the number of nodes may be generated by receiving an indication of availability at the head-end 102 from each of the nodes 106 and 108. In another example, the head-end 102 may already be aware of the number of nodes 106 and 108 in the processing network based on standard interactions between the head-end 102 and the nodes 106 and 108. In an example, the indication of the number of nodes 106 and 108 may be an indication of the number of nodes 106 and 108 with processing bandwidth to perform a task beyond typical operation of the node 106 or 108 (e.g., beyond typical metering operations for a meter) and with sufficient access to power sources (e.g., the nodes 106 or 108 that are not battery powered). The indication of the number of nodes 106 and 108, either received from the nodes 106 and 108 or already known at the head-end 102, may also provide an indication of the number of nodes 106 and 108 with adequate processing power for the additional tasks beyond typical operation of the nodes 106 and 108 (e.g., the number nodes 106 and 108 capable of performing a cryptocurrency mining operation assuming available processing bandwidth).

At block 304, the process 300 involves assigning a nonce offset to each of the nodes 106 and 108 indicated as available at block 302. In an example of bitcoin mining, the total nonce values may be limited to a total amount of numbers available in a 32-bit field (i.e., the size of the nonce field). Accordingly, in the bitcoin mining example, the range of the nonce value is from 0 through 4,294,967,295 (i.e., $2^{32}-1$). The nonce values are used in cryptocurrency mining and other blockchain functions as a variable portion of a block header run through a hashing algorithm. The resulting hashed block header is used in a comparison with a target value, and the comparison determines if the nonce value generated a blockchain block that solved the target value problem. For example, when a value of the hashed block header is smaller than the target value, the block associated with the hashed block header satisfies the target value problem and enables the addition of the block to the blockchain.

By assigning nonce offsets to each of the nodes 106 and 108, the process 300 may improve a likelihood of covering as many nonce values as possible. For example, in an embodiment with one million nodes 106 and 108, the nonce offsets assigned to each of the nodes 106 and 108 may include approximately 4295 nonce values to cover the entire range of nonce values. In other examples, the nodes 106 and 108 may include redundancy to decrease the likelihood of a successful nonce value being lost in the lossy mesh network 112 of the IoT system 100. In such an example where two nodes 106 and 108 cover the same nonce range, each of the one million nodes may be assigned approximately 8590 nonce values to cover the entire range of nonce values twice.

When the nodes 106 and 108 include greater processing power, and the nodes 106 and 108 are capable of efficiently incrementing through the range of nonce values, offsets may also include time offsets and transaction offsets. As used herein, the term offset may relate to a window in which a specific node 106 or 108 operates for a number of variables. For example, some of the nodes 106 and 108 may increment through the nonce values at one time stamp indicated by a first time value (e.g., a first time offset), while other nodes 106 and 108 are assigned a different time stamp indicated by a different time value (e.g., a second time offset). In such an example, the first time stamp may be at 12:00 p.m., and the second time stamp may be at 12:10 p.m. In another example, the nodes 106 and 108 may be assigned variations in validated transactions that generate the block used to solve the target value problem. That is, different nodes 106 and 108 may hash block headers for blocks that are based on different validated transactions (e.g., different transaction offsets). In any example, the offsets may be established to perform as many hashing operations as possible using the pool of nodes 106 and 108 without significantly repeating any work done by the nodes 106 and 108 aside from planned redundancy that decreases a chance of the mesh network 112 losing a successful block.

At block 306, the process 300 involves assigning communication randomization windows to each node 106 or 108 of the IoT system 100. The communication randomization windows may include start and stop parameters in fractions of minutes. The start and stop parameters provide windows in which the nodes 106 and 108 are able to communicate with the head-end 102. By establishing communication randomization windows across the nodes 106 and 108 of the IoT system 100, communication from the nodes 106 and 108 may be staggered to avoid overwhelming the mesh network 112, overwhelming any other network across which the nodes 106 and 108 communicate (e.g., cellular networks, power line carrier networks, wired networks), and overwhelming the head-end 102 or other system managing the pool of nodes 106 and 108. Because the mesh network 112 is lossy by nature, limiting communication across the mesh network 112 by the nodes 106 and 108 to assigned staggered communication windows limits a maximum communication load on the mesh network 112 at a given time.

At block 308, the process 300 involves sending a message to the nodes 106 and 108 indicating an operation to perform and an expected result of the operation. In an example, the head-end 102 may provide each of the nodes 106 and 108 of the IoT system 100 a block that was created to solve a particular target value problem. The head-end 102 may also provide each of the nodes 106 and 108 with the expected result of a hashing algorithm on a block header of the block (e.g., the target value). In such an example, each of the nodes 106 and 108 may perform hashing operations on the block headers using the nonce offsets that were assigned to the nodes 106 and 108 at block 304.

In another example where processors of the nodes 106 and 108 are capable of efficiently processing the hashing operations, the head-end 102 may assign different blocks to the nodes 106 and 108 across the IoT system 100. As mentioned above, the blocks may be created to solve the particular target value problem. For example, several blocks may be created including different transactions, time stamps, or both the blocks may be provided to the nodes 106 and 108 or sets of nodes 106 and 108. By hashing several different block headers, the nodes 106 and 108 may perform hashing operations on a larger number of values instead of being limited to a number of nonce values associated with an individual block.

The expected result provided to the nodes 106 and 108 may be an indication of a particular target value problem for the current block of the blockchain. Accordingly, the operation performed by the nodes 106 and 108 may involve performing the hashing operation on a received block at the offset values for the nodes 106 and 108, and comparing the hash values of the block header to the target value to determine if the hash value of the block header is successful (e.g., a smaller number than the target value).

At block 310, the process 300 involves receiving an operation started response from the nodes 106 and 108 at the head-end 102. The operation started response provides an indication to the head-end 102 that the node 106 or 108 has commenced the hashing operation using the block and target value problem assigned to the node 106 or 108 by the head-end 102. The nodes 106 and 108 may communicate the operation started response during the communication randomization windows using the assigned start and stop parameters for each individual node 106 or 108. By communicating the operation started response during the communication randomization windows, the mesh network 112 is not overburdened with individual communications from each of the nodes 106 and 108 sent simultaneously.

In addition to receiving the operation started response, the nodes 106 and 108 may also provide status and health updates to the head-end 102 during the communication randomization windows. The status and health updates may provide an indication to the head-end 102 of the processing statuses of the nodes 106 and 108. Further, the head-end 102 may use the status and health updates to determine if any of the nodes 106 and 108 have processing delays. The status and health updates may also enable to the head-end 102 to determine the performance of a bulk operation of the nodes 106 and 108 performing the hashing operations. The head-end 102 may use this information to reassign offsets from underperforming nodes 106 and 108 to other nodes 106 and 108 operating more efficiently. In an example, the head-end 102 may also use the information from the status and health updates to reallocate offsets when solving future target value problems.

At block 312, the process 300 involves receiving a success indication from a node 106 or 108. When one of the nodes 106 and 108 performs a hashing operation that meets the target value problem, the successful node 106 or 108 may immediately communicate, or communicate without waiting for a next communication window, a success message to the head-end 102. The success message includes the successful nonce value of the block and an indication of the successful hash value of a block header of the successful block. In an example, the success message may be repeated by the node 106 or 108 until the head-end 102 provides acknowledgement of receipt of the success message.

In an example, the success message provided by the node 106 or 108 to the head-end 102 may be encrypted. Encryption of the success message may prevent a competitor or unauthorized entity from intercepting the success message and stealing the successful block. In such an example, the head-end 102 may use a decryption key to decode the success message prior to verifying that the successful block solves the target value problem.

At block 314, the process 300 involves verifying a match (e.g., a nonce match value indicating that a hash value of the block header that includes the nonce match value is less than the target value) and sending a bulk stop message to the nodes 106 and 108. The verification process may involve performing the hashing operation on a block header of the block received in the success message to verify that the result is less than the target value. In an example, the nonce match value is one of the nonces within a nonce offset of a particular node 106 or 108 that results in a block header that is hashed to a value smaller than the target value. If the head-end 102 verifies that the block was successful, the head-end 102 may send the bulk stop message to the nodes 106 and 108. The bulk stop message instructs the nodes 106 and 108 to stop working on the current problem (e.g., the target value problem). When the bulk stop message is sent to the nodes 106 and 108, the head-end 102 may begin a new target value problem for the next block of the blockchain.

Further, upon verifying the match by the head-end 102, the head-end 102 may submit the successful block for success verification from other blockchain miners working on the same target value problem. In a bitcoin example, a majority of the blockchain miners may verify the submitted successful block for the successful block to be added to the blockchain. When the successful block is added to the blockchain, an entity controlling the IoT system 100 receives the proof of work incentive (e.g., bitcoins, other cryptocurrency, or other incentives).

In an example, any of the messages transmitted from the head-end 102 to the nodes 106 and 108 may include a digital signature. In some examples, two digital signatures may be valid during an overlap period associated with performance of a key update operation by the processing network. In such an example, each of the nodes 106 and 108 may be provisioned with a public key of the processing network and a backup public key of the processing network. Similarly, the head-end 102 may be provisioned with a private key and a backup private key associated with the public key and the backup public key, respectively. The public key and the backup public key are associated with different expiration dates. In an example, the overlapping time period of the public key and backup public key may be implemented to prevent denial of service attacks on the processing network.

To update the public key and the backup public key, the head-end 102 may transmit a message across the processing network indicating a new backup public key and an associated expiration dates. In an example, the message indicated the new backup public key may be signed by the head-end 102 using the previous backup private key. The result is the transition of the previous backup private key and backup public key to become the new private key and the new public key. The messages indicating the new backup public key may be simultaneously transmitted to all of the nodes 106 and 108, and the nodes 106 and 108 may confirm receipt of the message using the assigned communication randomization windows. In addition to digital signatures on messages originating from the head-end 102, the nodes 106 and 108 may also digitally sign messages provided to the head-end 102.

Figure 4:
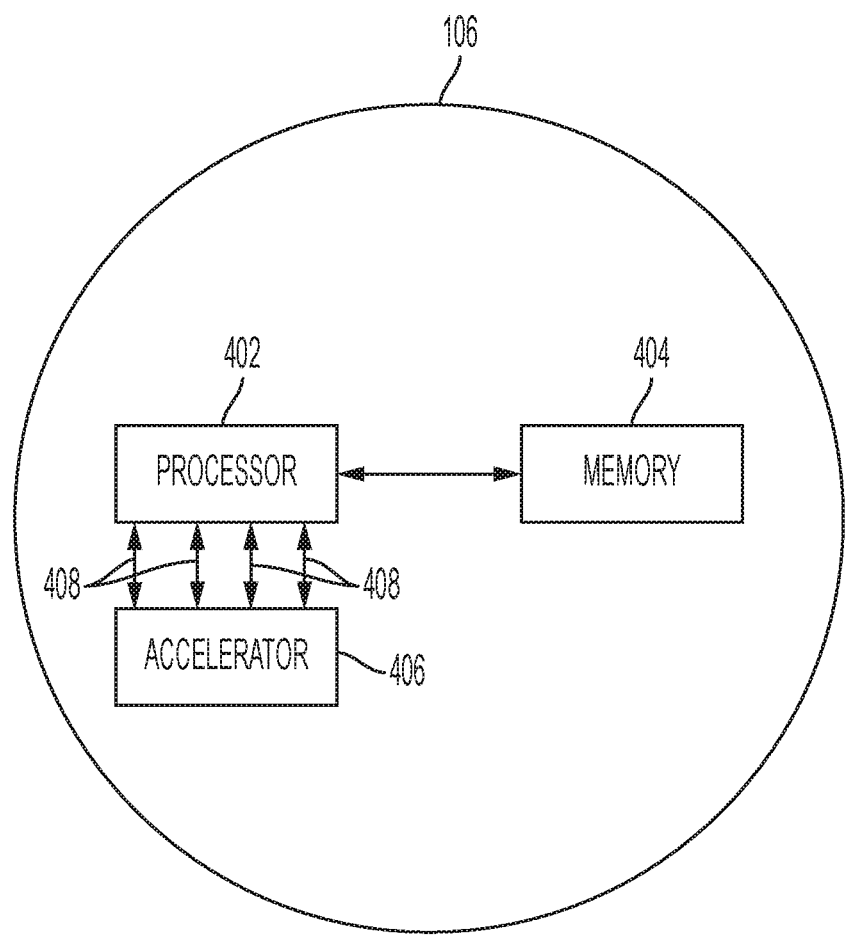
FIG. 4 is an example of a node of the IoT system including a crypto-accelerator, in accordance with one or more examples.

FIG. 4 is an example of a node 106 or 108 (e.g., an endpoint) of the IoT system 100 including a crypto-accelerator. The node 106 or 108 may include a processor 402 and a memory 404. The memory 404 may include a non-transitory computer-readable medium that is capable of storing computer-readable instructions that are executable by the processor to perform operations relating to the node 106 or 108. For example, if the node 106 or 108 is a smart metering device, the memory 404 may store instructions that are executed by the processor to take meter readings and to communicate the meter readings to the head-end 102. The memory 404 may also store information relating to the operation of the node 106 or 108, such as data associated with the meter readings.

During operation, the node 106 or 108 may go through periods of low activity. During the periods of low activity, the processor 402 may be idle or operating at a level well below the processing bandwidth of the processor 402. Accordingly, the process 300, discussed above, may utilize a pool of processors 402 from a pool of nodes 106 and 108 to perform cryptocurrency mining operations or other operations during idle processing cycles of the processors 402 to utilize the pooled processing power of the nodes 106 and 108 within the IoT system 100.

To increase processing speed of an operation performed by the processors 402 from the pool of nodes 106 and 108, some or all of the nodes 106 and 108 may include crypto-accelerators 406. The crypto-accelerators 406 may be installed within the nodes 106 and 108 as a co-processor that is designed specifically to efficiently perform cryptographic operations, such as cryptocurrency mining. Installation of the crypto-accelerator 406 may occur during manufacturing of the nodes 106 and 108, or the crypto-accelerator 406 may be retrofitted into existing nodes 106 and 108. The crypto-accelerators 406 may perform the hashing operations much more efficiently than the processor 402. For example, the crypto-accelerators 406 may be able to perform the hashing algorithm on multiple block headers with different nonce values simultaneously, as indicated by arrows 408. Such an example may provide a multiplier to the speed at which the node 106 or 108 is able to perform the hashing operations. Further, the crypto-accelerators 406 may limit impact of cryptographic operations on primary functions of the nodes 106 and 108 in the IoT system 100.

Figure 5:
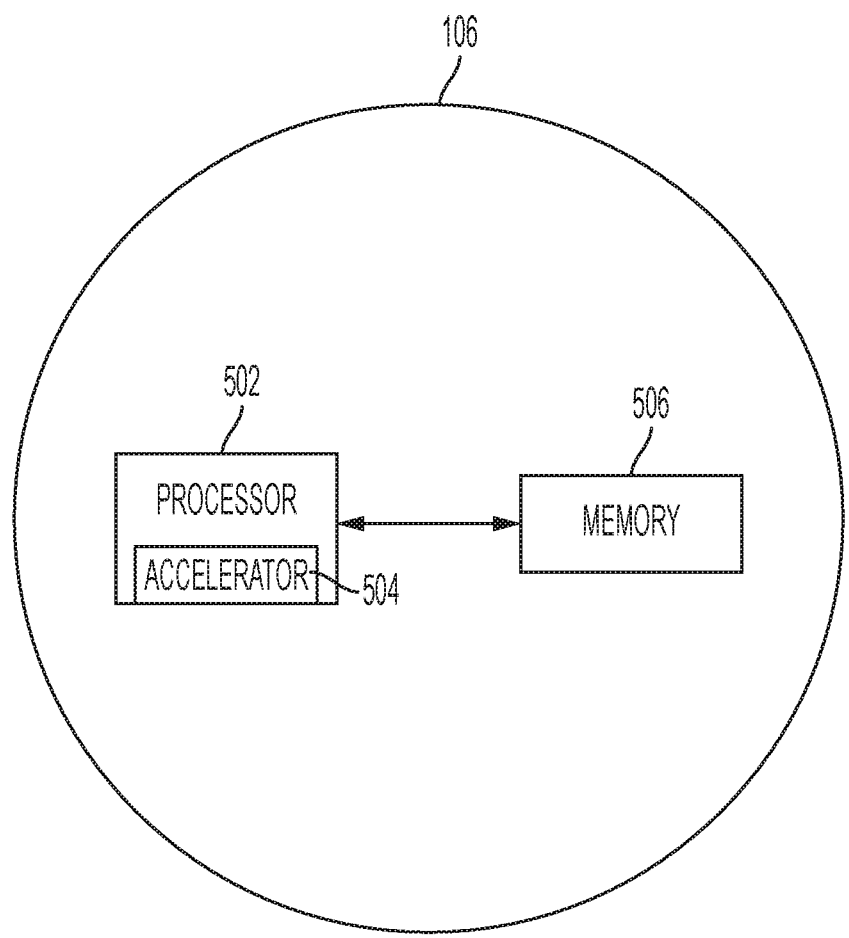
FIG. 5 is an example of node of the IoT system including a processor with an integrated crypto-accelerator block, in accordance with one or more examples.

FIG. 5 is an example of a node 106 or 108 of the IoT system 100 including a processor 502 with an integrated crypto-accelerator block 504. The node 106 or 108 may include the processor 502 and a memory 506. The memory 506 may include a non-transitory computer-readable medium that is capable of storing instructions that are executable by the processor 502 to perform operations relating to the node 106 or 108. For example, if the node 106 or 108 is a smart metering device, the memory 506 may store instructions that are executed by the processor 502 to take meter readings and to communicate the meter readings to the head-end 102. The memory 506 may also store information relating to the operation of the node 106 or 108, such as data associated with the meter readings.

During operation, the node 106 or 108 may go through periods of low activity. During the periods of low activity, the processor 502 may be idle or operating at a level well below the processing bandwidth of the processor 502. Accordingly, a pool of processors 502 from a pool of nodes 106 and 108 of the IoT system 100 may be exploited to perform cryptocurrency mining operations or other operations during idle processing cycles of the processors 502 to utilize to pooled processing power of the nodes 106 and 108 within the IoT system 100.

To increase processing speed of an operation performed by the processors 502 from the pool of nodes 106 and 108, some or all of the processors 502 of the nodes 106 and 108 may include the crypto-accelerator blocks 504. The crypto-accelerator blocks 504 may be integral components of the processors 502. Further, the crypto-accelerator blocks 504 may include configurable operation settings, offset settings, target value settings, and interrupt settings. The operation settings may include a type of operation that the head-end 102 wants the node 106 or 108 to perform (e.g., hashing a block header while incrementing nonce values). The offset settings may include an offset range in which the node 106 or 108 operates (e.g., a range of nonce values to use in hashing operations). The target value settings may include a target for the operation the node 106 or 108 is instructed to perform (e.g., the target value of a target value problem). The interrupt settings may include how the node 106 or 108 is to react upon achieving the target indicated in the target settings (e.g., how the node 106 or 108 sends a success message).

Similar to the crypto-accelerators 406, the integral crypto-accelerator blocks 504 may perform the hashing operations much more efficiently than a general purpose processor. For example, the crypto-accelerator blocks 504 may perform the hashing algorithm on multiple block headers with different nonce values simultaneously. Such an example may provide a multiplier to the speed at which the node 106 or 108 is able to perform the hashing operations.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects.

Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method for performing a blockchain operation, comprising:
   receiving an indication of a number of a plurality of endpoints in a processing network;
   assigning nonce offsets to each endpoint of the plurality of endpoints, wherein ranges of the nonce offsets comprise a total number of available nonces in the blockchain operation divided by a number smaller than half of the number of the plurality of endpoints, wherein each endpoint is assigned an individual nonce offset that is also assigned to at least one other endpoint, and wherein one of the ranges of the nonce offsets comprises a nonce match value;
   assigning communication randomization windows to each endpoint of the plurality of endpoints, wherein the communication randomization windows are configured to stagger communication windows of the endpoints to a head-end;
   sending a message to each of the endpoints indicating an operation to perform and an expected result;
   receiving a success indication from a first endpoint of the plurality of endpoints, wherein the success indication comprises the nonce match value from the nonce offset of the first endpoint; and
   verifying the nonce match value with the expected result.

2. The method of claim 1, wherein the endpoints comprise an Internet of Things network of devices, wherein the devices each comprise communication technology enabling communication across the Internet of Things network.

3. The method of claim 2, wherein the devices comprise smart metering devices.

4. The method of claim 1, wherein the operation to perform comprises a hashing algorithm, and wherein the expected result comprises a target value.

5. The method of claim 1, wherein the nonce match value comprises one of a total number of available nonces that, when provided to a hashing algorithm, results in a hash value that is less than a target value of the expected result.

6. The method of claim 1, comprising:
   receiving a proof of work incentive upon verification of the nonce match value with the expected result; and
   adding a new block to a blockchain, wherein the new block is based on the nonce match value.

7. The method of claim 6, wherein the proof of work incentive comprises a predetermined amount of a cryptocurrency.

8. A system, comprising:
   a head-end; and
   a plurality of nodes configured to communicate with the head-end, each of the plurality of nodes comprising:
      a processor configured to execute computer-readable instructions;
      a memory configured to store the computer-readable instructions that, when executed by the processor, cause the processor to perform operations comprising:
         receiving a nonce offset, wherein the nonce offset comprises a range of nonce values smaller than a total number of nonce values available in a blockchain operation;
         receiving a communication randomization window from a plurality of communication randomization windows, wherein the plurality of communication randomization windows are configured to stagger communication of the plurality of nodes to the head-end;
         receiving an indication of an operation to perform and an expected result;
         performing hashing operations based on the operation to perform and the nonce offset, wherein performing the hashing operations comprises:
            calculating a first hash value of a first block header, wherein the first block header comprises a first nonce value within the nonce offset;
            generating a success indication when the first hash value satisfies the expected result;
            calculating a second hash value of a second block header when the first hash value does not satisfy the expected result, wherein the second block header comprises a second nonce value within the nonce offset; and
            generating the success indication when the second hash value satisfies the expected result; and
         transmitting the success indication to the head-end upon achieving the expected result, wherein the success indication comprises a nonce match value from the nonce offset.

9. The system of claim 8, wherein the plurality of nodes comprise a plurality of smart metering devices.

10. The system of claim 8, wherein the operations further comprise:
    digitally signing the success indication prior to transmitting the success indication to the head-end; and
    receiving a digitally signed bulk stop message from the head-end, wherein the bulk stop message is provided to each node of the plurality of nodes to instruct each of the nodes to stop work on the operation to perform.

11. The system of claim 8, wherein performing the hashing operations comprises performing a secure hash algorithm 256 (SHA-256) on a block header comprising a nonce value within the nonce offset.

12. The system of claim 8, each of the plurality of nodes further comprising:
    a crypto-accelerator co-processor configured to simultaneously perform the hashing operations on multiple block headers with different nonce values within the nonce offset.

13. The system of claim 8, wherein the processor comprises a crypto-accelerator block configured to simultaneously perform the hashing operations on multiple block headers with different nonce values within the nonce offset.

14. The system of claim 8, wherein the expected result comprises a target value, and the nonce match value is any nonce value within the nonce offset that generates a hash value of a block header less than the target value.

15. The system of claim 8, wherein at least one of the plurality of nodes comprises a smart metering device, and the hashing operations of the smart metering device are performed during idle processing cycles of the smart metering device.

16. A method, comprising:
    receiving a nonce offset, wherein the nonce offset comprises a range of nonce values smaller than a total number of nonces available in a blockchain operation;
    receiving a communication randomization window;

receiving an indication of an operation to perform and an expected result;

performing hashing operations based on the operation to perform and the nonce offset;

digitally signing a success indication upon achieving the expected result, wherein the success indication comprises a nonce match value from the nonce offset;

transmitting the success indication to a head-end of a processing network upon digitally signing the success indication; and receiving a digitally signed bulk stop message from the head-end, wherein the bulk stop message is provided to each node of the processing network to instruct each of the nodes to stop work on the operation to perform.

17. The method of claim 16, wherein the expected result comprises a target value, and the nonce match value comprises a nonce value from the nonce offset that, when provided to a hashing algorithm, results in a hash value that is less than the target value.

18. The method of claim 16, further comprising:

encrypting the success indication prior to transmitting the success indication to the head-end of the processing network.

19. The method of claim 16, wherein the range of nonce values of the nonce offset comprises a total number of available nonce values in the blockchain operation divided by a number smaller than half of a number of a plurality of endpoints of the head-end of the processing network, wherein each endpoint of the plurality of endpoints is assigned an individual nonce offset that is also assigned to at least one other endpoint of the plurality of endpoints.

20. The method of claim 16, wherein performing the hashing operations comprises:

calculating a first hash value of a first block header, wherein the first block header comprises a first nonce value within the nonce offset;

transmitting the success indication when the first hash value satisfies the expected result;

calculating a second hash value of a second block header when the first hash value does not satisfy the expected result, wherein the second block header comprises a second nonce value within the nonce offset; and transmitting the success indication when the second hash value satisfies the expected result.

* * * * *